United States Patent [19]

Bolt et al.

[11] Patent Number: 5,215,582
[45] Date of Patent: Jun. 1, 1993

[54] WATER-BASE AEROSOL COATING COMPOSITION

[75] Inventors: Gary L. Bolt, Watseka; Bruce R. Brouillette, Sauk Village, both of Ill.

[73] Assignee: United Coatings, Inc., Kankakee, Ill.

[21] Appl. No.: 771,171

[22] Filed: Oct. 3, 1991

Related U.S. Application Data

[63] Continuation-in-part of Ser. No. 565,355, Aug. 9, 1990, abandoned.

[51] Int. Cl.$^5$ .......................... C08K 5/11; C08K 5/54; C08L 83/04; C08L 93/00
[52] U.S. Cl. .................................... 106/499; 106/401; 106/468; 106/471; 106/476; 106/486; 106/DIG. 4; 106/14.21; 106/14.42; 106/14.44; 524/378; 524/608; 524/903
[58] Field of Search .............. 106/401, 499, 468, 471, 106/476, 486, DIG. 4, 14.21, 14.42, 14.44; 524/378, 608, 903

[56] References Cited

U.S. PATENT DOCUMENTS

| | | | |
|---|---|---|---|
| 3,032,521 | 5/1962 | Sanderson | 524/84 |
| 3,207,386 | 9/1965 | Presant et al. | 252/305 |
| 3,547,854 | 12/1970 | Roth et al. | 106/18.31 |
| 4,010,126 | 3/1977 | Kuzma | 527/7 |
| 4,014,841 | 3/1977 | Taub | 524/249 |
| 4,102,843 | 7/1978 | Sperry et al. | 524/219 |
| 4,133,786 | 1/1979 | Harris et al. | 524/601 |
| 4,133,790 | 1/1979 | Sekmakas et al. | 523/411 |
| 4,187,204 | 2/1980 | Howard | 523/402 |
| 4,265,797 | 5/1981 | Suk | 524/389 |
| 4,420,575 | 12/1983 | Rapaport et al. | 106/252 |
| 4,450,253 | 5/1984 | Suk | 524/378 |
| 4,482,662 | 11/1984 | Rapaport et al. | 106/252 |
| 4,518,734 | 5/1985 | Brouillette | 524/378 |
| 4,578,415 | 3/1986 | Learner | 524/378 |

OTHER PUBLICATIONS

Hawley's condensed chemical Dictionary, 11th Ed. Van Nostrand Rheinhold, N.Y. 1987.
Publication, Bulletin B1, Sep. 19, 1983, Buckman Laboratories, Memphis, Tenn.
BYK Chemie U.S.A., Provisional Technical Data Sheet, *Additive to Increase Mar Resistance and Add Slip as well as Surface Flow*, (no date available).
Translation of Japanese Patent Publication No. 23640/1979; Publication Date Feb. 22, 1979; Application No. 88526/1977; Filed Jul. 23, 1977; Inventors, Mikami et al.

*Primary Examiner*—Mark L. Bell
*Assistant Examiner*—Scott L. Hertzog
*Attorney, Agent, or Firm*—Welsh & Katz, Ltd.

[57] ABSTRACT

A water-base aerosol coating composition, for application to a surface to be coated from a pre-packaged pressurized spray container, which contains greater than 10 Wt. % and up to about 25 Wt. % of a water dispersible acrylic modified alkyd resin, from about 0.4 to about 0.6 Wt. % of an amine neutralizing agent, less than 0.45 Wt. % of an organophilic clay dispersing agent, and from about 0.1 to about 0.5 Wt. % of an organic rheological agent. The formulation also includes from about 11 to about 17 Wt. % of a first solvent comprising glycol ether, from about 14 to about 18.5 Wt. % of a second solvent comprising water, and from about 38 to about 42 Wt. % of a cosolvent propellant comprising dimethyl ether. From about 1.17 Wt. % to less than 2.46 Wt. % of a barium metaborate monohydrate corrosion inhibitor is included, and an antiblock function is provided by including more than 0.3 wt. % of a solution of polyether modified dimethylsiloxane copolymer in a solvent of xylene and monophenyl glycol, with the solution containing from about 11.5 Wt. % to about 13.5 Wt. % of non-volatile matter.

9 Claims, No Drawings

WATER-BASE AEROSOL COATING COMPOSITION

CROSS-REFERENCE TO RELATED APPLICATION

This is a continuation-in-part application of the prior application filed on Aug. 9, 1990 having Ser. No. 07/565,355, abandoned, and entitled "WATER-BASE AEROSOL COATING COMPOSITION".

BACKGROUND OF THE INVENTION

The present invention relates to the field of paint formulations, and particularly to sprayable coating compositions. Most particularly, the present invention relates to a water-base aerosol coating composition, for application to a surface to be coated from a pre-packaged pressurized spray container.

Water-base paints have become very popular in recent years as a result of their ease of brush application and the tremendous advantage permitted by water clean-up. Brushes can be very easily rinsed in water, with or without detergent, and the clean-up water can usually be easily disposed of. Water-base formulations have been devised to dry rapidly with very little odor and with high water resistance when finally dried.

More recent years have seen the development of water-base paint formulations which can be dispensed in aerosol form. Such water-base aerosol coating formulations have a distinct advantage over the prior art oil-base paints which have been used in aerosol spray cans since the oil-base aerosol spray cans often employ solvents and propellants which have in recent years been recognized as imposing severe environmental hazards. For example, certain such chemicals, notably the halogenated fluorocarbons and chlorocarbons, such as the FREONs which have been used as propellants, are now recognized to produce damage in the ozone layer of the stratosphere. In addition, certain solvents and propellants which have been used in the oil-base paints are now known to be hallucinogens, carcinogens or other health hazards.

However, water-base paints must be carefully formulated in order to avoid the problems of stability and aerosol can corrosion. Additionally, while there have been water-base paint formulations devised to yield somewhat of a semi-gloss coating, a high gloss coating has generally only been commercially available with paint having an oil base. Furthermore, a common problem associated with the extremely heterogeneous water-base formulations of aerosol paints containing non-soluble resins has been foaming, which is a common difficulty requiring fine formulation balances to keep foaming absent or controlled. Foam cavitation in deposited film coatings often leads to permanent film imperfections in the dried paint.

Accordingly, it is an object of the present invention to provide a water-base paint formulation for use in aerosol spray cans which has high stability.

It is another object of the present invention to provide a water-base paint formulation for use in aerosol spray cans which has low corrosion within the can and upon the surface which is to be coated with the paint formulation.

It is an additional object of the present invention to provide a water-base paint formulation for use in aerosol spray cans which will provide a final surface coating having a high gloss.

It is a further object of the present invention to provide a water-base paint formulation for use in aerosol spray cans which has a low tendency to foam, without the addition of anti-foam agents in the paint formulation.

These and other objects of the present invention, as well as the advantages thereof, will become readily apparent from the disclosure which follows.

SUMMARY OF THE INVENTION

The present invention eliminates the foregoing disadvantages of the prior art by providing a paint formulation which can be dispensed in aerosol form, but which is water-receptive and which can be readily cleaned up with water. Formulations are provided in accordance with this invention to obtain coatings ranging from flat to high gloss. Specifically, these formulations permit spraying as an aerosol without the formation of foam, and the paint when applied can be readily cleaned up with water. After drying, the resultant coating is quite water resistant. More importantly, the aforementioned environmental and health hazards are significantly reduced by the formulation of this invention.

In one embodiment, the present invention comprehends a water-base aerosol coating composition, for application to a surface to be coated from a pre-packaged pressurized spray container, which comprises from greater than 10 to about 25 Wt. % of a resin solution of water dispersible monomer modified alkyd resin; from about 0.4 to about 0.6 Wt. % of an amine neutralizing agent; less than 0.45 Wt. % of an organophilic clay antisettling and antisag agent; and from about 0.1 to about 0.5 Wt. % of an organic rheological agent (antisettling and antisag agent). The formulation also contains from about 0 to about 20 Wt. % of at least one pigment, the 0% producing a clear transparent surface coating. For colored coatings, the amount of pigment will vary, of course, depending upon the specific color and the color intensity to be achieved. In general, the pigment content is typically from about 1 to about 10 Wt. %.

The formulation further contains from about 1.17 Wt. % to less than 2.46 Wt. % of barium metaborate monohydrate as a corrosion inhibitor, and more than 0.3 Wt. % of an antiblock agent solution of polyether modified dimethylsiloxane copolymer in a solvent of about seven parts of xylene with about two parts of monophenyl glycol, with the solution containing from about 11.5 Wt. % to about 13.5 Wt. % of non-volatile matter. The formulation additionally contains from about 0 to about 0.55 Wt. % of at least one wetting agent or surfactant, in order to help disperse the pigments within the formulation. Typically, the wetting agent will comprise from about 0.35 to about 0.55 Wt. % of the formulation. Drying agents are also employed in an amount from about 0.25 to about 0.50 Wt. % of the formulation, for accelerating oxidation of the applied coating to facilitate drying.

The formulation employs a multi-component solvent system, the first solvent comprising from about 14 to about 18.5 Wt. % of water which is preferably deionized. The propellant system comprises from about 38 to about 42 Wt. % dimethyl ether, which also functions as a cosolvent. Finally, a glycol ether cosolvent provides substantially all of the remaining Wt. % of the water-base aerosol coating composition.

A clearer understanding of the present invention will be obtained from the disclosure which follows.

DESCRIPTION OF THE PREFERRED EMBODIMENTS

The water dispersible and water-soluble monomer modified alkyd resins which are suitable for use in this invention are well known to those skilled in the art of paint formulations. As used herein, the term water dispersible is meant to include not only the water dispersible resins, but also the water-soluble resins. Such resins are readily available from resins suppliers such as Cargill, Ashland Oil Company, McWhorter, and Reichhold Chemical. One preferred monomer modified alkyd resin which has been found to be suitable for this invention is identified as Kelsol 3990, which is available from Reichhold Chemical. This resin is a water dispersible acrylic modified alkyd resin dissolved in Ektasolve EP solvent, the solution comprising 65 Wt. % non-volatiles and 35 Wt. % of the Ektasolve EP. Ektasolve EP is propoxy ethanol. A typical analysis for this water dispersible acrylic modified alkyd resin is presented in Table A.

TABLE A

TYPICAL ANALYSIS OF
ONE PREFERRED RESIN SOLUTION

| | |
|---|---|
| Non-volatiles, Wt. % (Kelsol 3990) | 65 |
| Solvent, Wt. % (Ektasolve EP) | 35 |
| Viscosity, Stokes @ 25 Degrees C. | 30 |
| Acid Value, Solids | 40 |
| Specific Gravity | 1.031 |
| Flash Point, Degrees F. | 124 |

It is well known to those skilled in the art that amine or ammonia neutralization of carboxyl-containing resins will form water-soluble type resins. The neutralizing amine may affect stability, film discoloration, film defects, gloss, foam, viscosity reduction and cost. Therefore, the particular amine utilized will depend upon the goal to be achieved with the particular paint composition. Examples of amine neutralizers that may be used in the formulation of this invention include ammonia (usually in aqueous solution), triethylamine, 2-dimethylamino-2-methyl-1-propanol, trimethylamine, N,N-diethanolamine, triethanolamine, 2-amino-2-methyl-1-propanol, methylamine, ethylamine, N,N-dimethylethanolamine, diethanolamine, morpholine, monoethanolamine, aminomethylpropanol and diethylamine. In one preferred embodiment, the formulation of this invention utilizes monoethanolamine. In a particularly preferred embodiment, the formulation uses 2-amino-2-methyl-1-propanol, which is available as AMP-95 from Angus Chemical Company of Northbrook, Ill.

The formulation further includes less than 0.45 Wt. % of an organophilic clay antisettling and antisag agent. One such agent is available from Rheox Corporation and is identified as Bentone SD-2. The preferred level of the organophilic clay is from about 0.25 to about 0.35 Wt. % of the aerosol coating composition. A clay content which reaches or exceeds the 0.45 Wt. % level will interfere with the gloss of the finished coating when it has been sprayed on the surface being painted.

From about 0.1 to about 0.5 Wt. % of an organic rheological agent is also contained within the formulation. One suitable rheological agent which is used in the formulations of this invention is identified as MPA 1075 which is available from Rheox Corporation. The MPA 1075 comprises castor wax in butanol solvent. It functions as an antisettling agent which improves sag resistance of the paint coating when it has been sprayed on a surface.

Pigments are added to the formulation in order to provide color and coverage or hiding power. Any of the usual inorganic or organic pigments may be used. In this regard, the word pigment is used in its broader sense to include not only organic and inorganic colorants, but also organic dyes. The pigment content in the formulation may range from about 0 to about 20 Wt. % of at least one pigment, with 0 Wt. % producing a clear transparent surface coating. Excessive pigment in the total paint composition may materially interfere with the specular reflection or gloss of the deposited dry aerosol film. Therefore, in many formulations the content of pigment will range from about 1 to about 10 Wt. %. Examples of useful pigments include titanium dioxide, carbon black, phthalocyanines, molybdates, perlenes, flavanthrones, quinacridones, iron oxide, and other known paint pigments. The pigment formulation typically includes wetting agents to help disperse the pigments in the paint formulation.

A first solvent of the aerosol paint formulation comprises from about 14 to about 18.5 Wt. % of water, but in some formulations a lower limit of about 16 Wt. % may be required. The water preferably is deionized. This range of water content is below the range of water content for prior art water-base paint formulations. It appears to provide high gloss to the finished coating product while significantly reducing any incidents of foaming.

From more than 10 to about 25 Wt. % of the formulation comprises a cosolvent of glycol ether. Glycol ethers are well known to those skilled in the art of paint formulations, and they include ethylene glycol monoalkyl ethers, propylene glycol monoalkyl ethers, and ethylene glycol monoalkyl acetates. Examples of the glycol monoalkyl ethers are ethylene glycol monomethyl ether, ethylene glycol monoethyl ether, ethylene glycol mono N-butyl ether, and propylene glycol methyl ether. Ethylen glycol monomethyl ether acetate exemplifies a typical ethylene glycol monoalkyl acetate. The particularly preferred glycol ether is propylene glycol methyl ether. The amount of the glycol ether solvent will vary depending upon the specific formulation for the given pigmented paint. However, the glycol ether content is generally up to about 17.0 Wt. %, and a preferred range for the glycol ether content is from about 11 to about 17 Wt. % of the complete aerosol paint formulation.

From about 0.25 to about 0.50 Wt. % of at least one drying agent will be found within the formulation. Such drying agents accelerate the oxidation of the resin coating in order to facilitate drying. Commercially available dryers are well known to those skilled in the art of paint formulation, and include such components as cobalt naphthenate, manganese carboxylate, zirconium carboxylate, calcium carboxylate, and cobalt carboxylate. Such dryers are typically provided in solutions containing insoluble solvents such as mineral spirits, but these solvents are tolerated by the aqueous coating formulation of the present invention since they are widely dispersed throughout the aqueous coating system at a very low concentration. In addition, the dryer formulation may include a dryer activator such as Activ-8.

The inventive formulation also contains from about 1.3 Wt. % to less than 2.46 Wt. % of a barium metaborate monohydrate composition as a corrosion inhibitor. This additive is purchased as Busan 11-M1 from Buckman Laboratories, Inc. of Memphis, Tenn. It is a particulate solid containing 90+ Wt. % of active ingredient, with 99.5 Wt. % of the product having a particle size of 20 microns or less. Thus, the formulation contains about 1.17 Wt. % active ingredient.

The formulation further contains more than 0.3 Wt. % of a polyether modified dimethylsiloxane copolymer in a solvent of about seven parts of xylene with about two parts of monophenyl glycol, with the solution containing from about 11.5 Wt % to about 13.5 Wt. % of non-volatile matter. This material is a commercially available mar resistant slip additive for solvent based paints and for amine-neutralized water-reducible systems, but it surprisingly functions as an antiblock agent in the water-base aerosol paint formulation of the present invention. It may be obtained from BYK-Chemie USA of Wallingford, Conn. as BYK-306.

The propellant of the present invention, dimethyl ether, is also soluble in the water of the aerosol paint formulation together with glycol ether. Thus, the propellant acts as a co-solvent for the hereinabove identified monomer modified alkyd resin of the formulation when the total formulation is contained within the pressurized aerosol spray container. The solvent portion of the propellant constitutes from about 38 to about 42 Wt. % of the total aerosol paint formulation for the packaged aerosol paint product. Other propellant hydrocarbons such as propane, butane, and isobutane should not be used for a part of the propellant charge, since it has been found that they may cause foaming. It is believed that the solubility of the dimethyl ether propellant within the aqueous solution of glycol ether solvent and the water dispersible acrylic modified alkyd resin produces an improved quality in the freshly deposited spray applied film of the aerosol paint, as well as an improvement in the quality of the dried coating of the paint film which results therefrom.

Having described the invention in general terms, the following specific Examples illustrate the best mode presently known for the practice of the present invention. Components are specified by weight or weight percent unless otherwise indicated.

THE TEST FORMULATION

In order to fully support the foregoing statements regarding the inventive paint formulation, tests were conducted to provide comparative data. These tests were made by varying the amount of specific components within a base paint composition falling within the inventive formulation. The paint formulation which was used as the standard for the comparative tests had the following composition:

TABLE B

| TEST FORMULATION FOR GLOSS WHITE COATING | |
|---|---|
| | Wt. % |
| Acrylic Modified Alkyd Resin Solution | 16.34 |
| Organophilic clay | 0.16 |
| Organic Rheological Agent | 0.16 |
| Dispersing Agent | 0.39 |
| Titanium Dioxide Pigment | 9.76 |
| Monoethanolamine | 0.51 |
| Glycol Ether | 14.44 |
| Cobalt Drier | 0.12 |
| Zirconium Drier | 0.19 |
| Activ-8 Drier | 0.08 |
| Antiblocking Agent | 0.25 |
| Deionized Water | 17.60 |
| Dimethylether Propellant | 40.00 |

EXAMPLE 1

The effect of varying the resin solution from the base amount shown in the test formulation was first evaluated. A sample containing 8 Wt. % of resin solution showed a very low viscosity which produced a sprayed coating on the test panel that had poor sag. The final appearance of the sprayed coating was inadequate since a low gloss or flat coating was obtained. A sample was evaluated at a 10 Wt. % resin solution and this sample showed low viscosity, poor sag, and a final appearance of the sprayed coating which was that of a semi-gloss. A sample of the formulation with a 27 Wt. % resin solution showed a formulation viscosity which was very thick, the formulation had bad sprayed properties, and the sprayed coating took two days to dry.

EXAMPLE 2

Variation of the amine content in the base paint formulation provided the following results. A sample with 0.3 Wt. % amine provided a composition where the resin would not accept the water. A sample with 0.7 Wt. % amine had a pH which was very high, and the sprayed coating turned yellow.

EXAMPLE 3

Variation of the Bentone organophilic clay provided the following results. A sample with 0.45 Wt. % of organophilic clay resulted in a formulation viscosity which was very thick, and the final appearance of the sprayed panel was hazy. A sample with 0.15 Wt. % of organophilic clay had a viscosity which was good, and the final appearance of the sprayed panel was very good.

EXAMPLE 4

The amount of organic rheological agent was varied and this resulted in the following results. A sample containing 0.07 Wt. % of the rheological agent provided a formulation which settled badly in the aerosol spray can. A sample with 0.60 Wt. % of organic rheological agent provided a good solubility, but the final appearance of the spray coated panel was hazy.

EXAMPLE 5

Varying the glycol ether content of the test formulation provided the following results. A formulation sample with 26 Wt. % of glycol ether gave an aerosol mixture which "kicked out" the sample into a two-phase system which was unacceptable. A sample with 19 Wt. % glycol ether also provided an aerosol mixture which kicked out the sample into a two-phase system and was not acceptable. A sample with 15 Wt. % glycol ether provided a single-phase liquid solution, with very good spray characteristics and good overall appearance for the spray coated panel. A sample with 9 Wt. % glycol ether provided a single liquid phase, with a very good aerosol spray which provided a good overall appearance for the coated test panel.

EXAMPLE 6

Variation of the water content in the formulation provided the following results. A sample at 20 Wt. % of water provided a low viscosity solution which produced a wet spray and the sag was poor for the coated panel. A sample at 15 Wt. % water provided an aerosol mixture with a viscosity which was thick, and the sample settled into a two-phase system very quickly.

EXAMPLE 7

Variation of the dimethyl ether content provided the following results. A solution containing 37 Wt. % of dimethyl ether provided a heavy spray and the sag resistance on the coated panel was not good. A sample with 46 Wt. % of dimethyl ether provided a good spray coating but the pressure of the formulation within the can increased to an unacceptable level when viewed under safety considerations.

EXAMPLE 8

Four water-base aerosol formulations were made to test corrosion resistance. Each of the sample formulations was applied to a 3×6 inch steel panel and allowed to sit for 7 days of curing before submitting the samples for salt spray evaluation. Sample No. 1 was the Test Formulation of Table B with no rust inhibitor added to the formulation. Sample No. 2 had Busan 11-M1 (Barium Metaborate Monohydrate) added to the formulation at 1.3 Wt. % in the aerosol can. Sample No. 3 had Busan 11-M1 added to the formulation at 2.46 Wt. % in the aerosol can. Sample No. 4 had Busan 11-M1 added to the formulation at 3.58 Wt. % in the aerosol can.

All panels were put in for testing at the same time and subjected to a 5% salt solution at ambient temperature. The control panel of Sample No. 1 was removed after only 20 hours because of heavy corrosion and very dense blisters. Samples No. 2 and 3 were removed after 50 hours because of moderate corrosion with few to medium blisters. Sample No. 4 was removed after 110 hours with moderate corrosion and medium blisters.

The addition of Busan 11-M1 proved to improve corrosion resistance of the coated panels at levels 1.3% to 3.58% by weight in the aerosol can.

EXAMPLE 9

Gloss was run on each of the panels of Example 8 before subjecting them to the salt spray test. The control panel (Sample No. 1) had a reading of 84 on a 60° gloss meter (Byk Gardner Gloss Meter). Sample No. 2 had a reading of 80 on a 60° gloss meter. Sample No. 3 had a reading of 71 on a 60° gloss meter. Sample No. 4 had a reading of 56 on a 60° gloss meter. Acceptable limits for a gloss coating would be a reading of 80 or above. This requirement, therefore, rendered the formulations of Samples No. 3 and 4 unsuitable. Since Busan 11-M1 contains 90+% active ingredient, this means that the suitable range of barium metaborate monohydrate in the inventive paint formulation ay run from about 1.17 Wt. % to less than about 2.46 Wt. %.

EXAMPLE 10

Another aspect of the invention paint formulations that was evaluated was the blocking problem of the spray coated product. The spray applied coating becomes tacky when subjected to heat or humidity, which makes the spray coated articles stick together when stacked on top of each other.

A series of spray coated panels was made for anti-block evaluation. Four control panels were spray coated with the paint formulation of Table B and allowed to cure for 7 days. Two panels were then placed one on top of the other with the spray coated surfaces in contact with each other in a face-to-face relationship. A 250 gram weight was placed on top of the panels and they were held in an oven for one hour at 120° F. A similar pair of panels with a 250 gram weight on top was held for one hour at ambient temperature. Both pairs of panels were severely blocked.

Similarly, blocking tests were run on panels which were spray coated with the paint formulation of Table B containing varying amounts of a mar resistant slip additive identified as BYK ®-306. The slip additive is blended into the control formulation at 0.1, 0.2, 0.3, 0.4 and 0.5 Wt. %. The samples containing 0.4 and 0.5 Wt. % are unblocked, but the other samples are found to be blocked.

EXAMPLE 11

The use of 2-amino-2-methyl-1-propanol (AMP-95 from Angus Chemical Company) was evaluated as a replacement for monoethanolamine as the neutralizing amine in paint formulations within the scope of the present invention. It was determined that the water solvent could be as low as about 14 Wt. % without detrimental effect upon the aerosol solution or upon the spray applied paint coating.

EXAMPLE 12

A gloss white water reducible aerosol paint formulation is produced according to the following procedure.

A water dispersible acrylic modified alkyd resin is added to a conventional mixing vessel in an amount of 1607 parts of resin solution. The resin solution is Kelsol 3990 dissolved in 35% Ektasolve EP to produce a solution having 65 Wt. % of non-volatiles. Fifty-two parts of AMP-95 are then added to the vessel for adjusting the pH and neutralizing the resin. The two components are mixed slowly for five minutes to allow for the neutralizing reaction to proceed. At this point, thirty-two parts of Bentone SD-2, an organophilic clay obtained from Rheox Corporation, are added.

The components are then mixed at high speed until a 7 grind is met on a Hegman grind gauge, and the speed is then reduced in order to add two additional components. The first component is 16 parts of MPA 1075 from Rheox Corporation, which is castor wax in butanol solvent. This material is added as a rheological agent and an antisettling agent. The second component added at this step is 41 parts of Tamol 731, which is obtained from Rohm and Haas Company. This material is the sodium salt of polymeric carboxylic acid and it functions as a dispersing or wetting agent.

The resulting batch of components is then mixed for five minutes at a very slow speed, at which time a pigment composition is added. The pigment composition comprises 1005 parts of titanium dioxide. Busan 11-M1 corrosion inhibitor is then added at 150 parts. At this point, all of the components are mixed at high speed until a 7 grind is met on the Hegman grind gauge and the temperature is above 120° F. It is to be noted that the MPA 1075 must be agitated under high shear and reach a temperature of at least 120° F. for a twenty minute dwell time in order to become fully activated. After the 120° F. temperature has been maintained for 20 minutes, the speed is reduced in order to add the solvents, the dryers, and the antiblock agent.

The first solvent added is 1207 parts of Arcosolve PM Solvent, which is a propylene glycol methyl ether solvent. The dryers or drying agents include Cobalt Hydro-Cure II at eight parts and Zirconium Hydro-Cem drying agent at sixteen parts, with a drying agent activator, Activ-8 HGL, at eight parts. Next, 50 parts of BYK-306 slip agent is added for achievement of an antiblock function. The resulting component mass is then mixed for five minutes before deionized water is added at 1808 parts. The pH is then adjusted by the addition of ammonia to reach a final pH of 8.0 to 8.5.

The resulting 6000 parts of paint formulation liquid is then delivered to a pressure filling apparatus where it is dispensed into aerosol spray cans. Each can is individually pressurized with propellant dimethyl ether, which also functions as a viscosity reducer and a cosolvent. The final pressurized aerosol cans contain a gloss white water reducible aerosol paint formulation in accordance with the composition which is presented in Table 1. Table 1 additionally identifies each of its components by its composition and function. Additionally, Table 1 identifies the supplier for each component.

EXAMPLE 13

A flat white water reducible aerosol paint composition is produced by following the procedure substantially as presented in the foregoing Example 1. The finished formulation for the aerosol paint product which results is set forth in Table 2. Table 2 also identifies the function and composition of each ingredient which has not been previously identified in Table 1.

TABLE 1

GLOSS WHITE WATER REDUCIBLE AEROSOL

| INGREDIENT | % WEIGHT |
|---|---|
| Resin Solution (65 Wt. % Kelsol 3990 in 35 Wt. % Ektasolve EP) (Reichhold Chemicals, Inc. Water dispersible acrylic modified alkyd resin) | 16.07 |
| AMP-95 (2-amino-2-methyl-1-propanol for adjusting pH and neutralizing resin, Angus Chemical Co.) | 0.52 |
| Bentone SD-2 (Rheox Corp., Organophilic Clay, antisettling and antisag agent) | 0.32 |
| MPA 1075 (Rheox Corp., Castor Wax in butanol solvent, Antisettling agent and rheological agent) | 0.16 |
| Tamol 731 (Rohm and Haas Company, Sodium Salt of Polymeric carboxylic acid, dispersing or wetting agent) | 0.41 |
| Titanium Dioxide, pigment | 10.05 |
| Arcosolve PM Solvent (Superior Solvents & Chemicals, Propylene Glycol Methyl Ether) | 12.07 |
| Busan 11-M1 (Corrosion Inhibitor; Buckman Laboratories, Inc.) | 1.50 |
| BYK-306 (BYK - Chemie USA; slip agent added for antiblock function) | 0.50 |
| Cobalt Hydro-Cure, drying agent (Mooney Chemical, Cobalt Naphthenate 45%, Mineral Spirits 30%, Dispersing agents 25%) | 0.08 |
| Zirconium Hydro-Cem, drying agent (Mooney Chemical, Zirconium Carboxylate 60%, Mineral Spirits 30%, Dispersing agents 10%) | 0.16 |
| Activ-8 HGL, drying agent activator (R. T. Vandervilt Co., Inc., 1,10 Phenanthroline in Hexylene glycol) | 0.08 |
| Deionized Water | 18.08 |
| Dimethylether, propellant | 40.00 |
| | 100.00 |

TABLE 2

FLAT WHITE WATER REDUCIBLE AEROSOL

| INGREDIENT | % WEIGHT |
|---|---|
| Resin Solution (65 Wt. % Kelsol 3990 in 35 Wt. % Ektasolve EP) | 11.61 |
| AMP-95 (amine) | 0.43 |
| Bentone SD-2 | 0.31 |
| MPA 1075 | 0.46 |
| Tamol 731 | 0.39 |
| Titanium Dioxide | 5.04 |
| Nytal 400 (R. T. Vanderbilt Co., Hydrous Silicate, flattening agent) | 10.45 |
| Arcosolve PM Solvent | 11.55 |
| Busan 11-M1 | 1.50 |
| BYK-306 | 0.50 |

TABLE 2-continued

FLAT WHITE WATER REDUCIBLE AEROSOL

| INGREDIENT | % WEIGHT |
|---|---|
| Cobalt Hydro-Cure | 0.12 |
| Zirconium Hydro-Cure | 0.24 |
| Activ-8 HGL | 0.08 |
| Deionized Water | 17.32 |
| Dimethylether | 40.00 |
| | 100.00 |

The Nytal 400 is a flattening agent which is added to reduce the gloss of the white paint formulation and the coating which is produced therefrom.

EXAMPLE 14

A gloss black water reducible aerosol paint composition is produced by following the procedure substantially as presented in the foregoing Example 1. The finished formulation which is contained in the aerosol spray cans has a composition in accordance with that presented in Table 3. The ingredients have been previously identified in the foregoing Table 1, with the exception of the carbon black for the pigment. The source of the carbon black is identified in Table 3.

EXAMPLE 15

A gloss red water reducible aerosol paint composition is produced by following the procedure substantially as presented in the foregoing Example 1. The final aerosol formulation in the spray cans has a composition as set forth in Table 4. The ingredients listed therein have been previously identified in Table 1, except that new ingredients which have not heretofore been identified are now identified in Table 4. These constitute the components of the pigment which produce the gloss red color.

The water reducible aerosol paint formulations of the present invention provide a significant reduction in the incidents of foaming, which results in improved quality surface coatings having enhanced gloss, except when flattening agents are added to diminish gloss.

TABLE 3

GLOSS BLACK WATER REDUCIBLE AEROSOL

| INGREDIENT | % WEIGHT |
|---|---|
| Resin Solution (65 Wt. % Kelsol 3990 in 35 Wt. % Ektasolve EP) | 21.68 |
| AMP-95 (amine) | 0.56 |
| Bentone SD-2 | 0.35 |
| MPA 1075 | 0.17 |
| Tamol 731 | 0.43 |
| 1255 Carbon Black (Cabot Co., Carbon Black) | 1.34 |
| Arcosolve PM Solvent | 14.48 |
| Busan 11-M1 | 1.50 |
| BYK-306 | 0.50 |
| Cobalt Hydro-Cure | 0.09 |
| Zirconium Hydro-Cure | 0.17 |
| Activ-8 HGL | 0.09 |
| Deionized Water | 18.64 |
| Dimethylether | 40.00 |
| | 100.00 |

TABLE 4

GLOSS RED WATER REDUCIBLE AEROSOL

| INGREDIENT | % WEIGHT |
|---|---|
| Resin Solution (65 Wt. % Kelsol 3990 in 35 Wt. % Ektasolve EP) | 21.47 |
| AMP-95 (amine) | 0.56 |
| Bentone SD-2 | 0.34 |
| MPA 1075 | 0.17 |

TABLE 4-continued
GLOSS RED WATER REDUCIBLE AEROSOL

| INGREDIENT | % WEIGHT |
| --- | --- |
| Tamol 731 | 0.43 |
| Titanium Dioxide | 0.28 |
| Red Iron Oxides (Pfizer Pigments Inc., Metal Oxide) | 0.74 |
| Yellow Iron Oxide (Mobay Chemical Corp., Hydrated Iron Oxide) | 0.65 |
| Brilliant Red (Hilton Davis Co., Organic Red Pigment) | 0.24 |
| Arcosolve PM Solvent | 14.32 |
| Busan 11-M1 | 1.50 |
| BYK-306 | 0.50 |
| Cobalt Hydro-Cure | 0.09 |
| Zirconium Hydro-Cure | 0.17 |
| Activ-8 HGL | 0.09 |
| Deionized Water | 18.45 |
| Dimethylether | 40.00 |
| | 100.00 |

While the typical aerosol spray may project an 18 inch flame, the aerosol spray of the inventive formulations are nonflammable. Moreover, they have improved corrosion resistance and improved resistance to blocking. Additionally, the inventive formulations do not attack the ozone layer of the stratosphere like the FREON propellants, and they have not been shown to be toxic. They also provide easy water clean-up, with or without detergent or soap, and the dried spray coated finished surfaces have a high water resistance.

In summary, the present invention provides a water-base aerosol paint composition capable of providing a highly resistant pigmented or unpigmented high gloss film on a substrate surface. Although the present invention has been described with preferred embodiments illustrated herein, it is to be understood that modifications and variations may be resorted to without departing from the spirit and scope of this invention, as those skilled in the art will readily understand. Such modifications and variations are considered to be within the purview and the scope of the appended claims.

The invention claimed:

1. A water-base aerosol coating composition, suitable for application to a surface to be coated from a prepackaged pressurized spray container, which comprises:
   a) greater than 10 Wt. % and up to about 25 Wt. % of a resin solution of a water dispersible acrylic modified alkyd resin;
   b) from about 0.4 to about 0.6 Wt. % of an amine neutralizing agent;
   c) less than 0.45 Wt. % of an organophilic clay antisettling and antisag agent;
   d) from about 0.1 to about 0.5 Wt. % of an organic rheological agent;
   e) from about 0 to about 20 Wt. % of at least one pigment;
   f) from about 0 to about 0.55 Wt. % of at least one wetting agent;
   g) from about 1.17 Wt. % to less than 2.46 Wt. % of a barium metaborate monohydrate corrosion inhibitor;
   h) about 0.3 Wt. % to about 0.5% of a solution of polyether modified dimethylsiloxane copolymer in a solvent of xylene and monophenyl glycol, with the solution containing from about 11.5 Wt. % to about 13.5 Wt. % of non-volatile matter;
   i) from about 14 to 18.5 Wt. % of a first solvent comprising water;
   j) from about 0.25 to about 0.50 Wt. % of at least one drying agent;
   k) from about 38 to about 42 Wt. % of a cosolvent propellant comprising dimethyl ether; and,
   l) a glycol ether cosolvent providing substantially the remaining Wt. % of the water-base aerosol coating composition.

2. The aerosol coating composition of claim 1 wherein said pigment content is from about one to about ten Wt. %.

3. The aerosol coating composition of claim 1 wherein said wetting agent content is from about 0.35 to about 0.55 Wt. %.

4. The aerosol coating composition of claim 1 wherein said amine is 2-amino-2-methyl-1-propanol.

5. The aerosol coating composition of claim 1 wherein said glycol ether content is up to about 17 Wt. %.

6. The aerosol coating composition of claim 5 wherein said glycol ether content is from about 11 to about 17 Wt. %.

7. The aerosol coating composition of claim 1 wherein said glycol ether is a propylene glycol monoalkyl ether.

8. The aerosol coating composition of claim 7 wherein said glycol ether is propylene glycol methyl ether.

9. The aerosol coating composition of claim 1 wherein said amine is monoethanolamine and said first solvent comprises from about 16 to 18.5 Wt. % water.

* * * * *